United States Patent [19]

Naito

[11] Patent Number: 5,152,362

[45] Date of Patent: Oct. 6, 1992

[54] DRIVING TORQUE DISTRIBUTION CONTROL SYSTEM FOR VEHICLE

[75] Inventor: Genpei Naito, Kanagawa, Japan

[73] Assignee: Nissan Motor Co., Ltd., Yokohama, Japan

[21] Appl. No.: 687,622

[22] Filed: Apr. 19, 1991

[30] Foreign Application Priority Data

Apr. 20, 1990 [JP] Japan .................. 2-104641

[51] Int. Cl.⁵ .......................... B60K 17/344
[52] U.S. Cl. ..................... 180/248; 180/233; 364/426.02
[58] Field of Search ............ 180/233, 247, 248; 364/426.02, 426.03

[56] References Cited

U.S. PATENT DOCUMENTS

| | | | |
|---|---|---|---|
| 4,679,463 | 7/1987 | Ozaki et al. | 74/711 |
| 4,741,407 | 5/1988 | Torii et al. | 180/76 |
| 4,754,834 | 7/1988 | Ozaki et al. | 180/233 |
| 4,790,404 | 12/1988 | Naito | 180/197 |
| 4,953,654 | 9/1990 | Imaseki et al. | 180/197 |

FOREIGN PATENT DOCUMENTS

| | | | |
|---|---|---|---|
| 61-157437 | 7/1986 | Japan . | |
| 0012422 | 1/1987 | Japan | 180/248 |
| 63-71428 | 3/1988 | Japan . | |
| 0060432 | 3/1989 | Japan | 180/247 |
| 0101237 | 4/1989 | Japan | 180/247 |

Primary Examiner—H. Grant Skaggs
Assistant Examiner—Carol Lynn Druzbick
Attorney, Agent, or Firm—Foley & Lardner

[57] ABSTRACT

A control system comprises a clutch for limiting a differential action between left and right drive wheels or varying a driving torque distribution between front and rear axles of a 4WD vehicle, a sensor group and a controller for controlling an engagement force of the clutch to control the differential limiting force or the torque distribution between the front and rear drive wheels. The sensor group includes an accelerator position sensor and a lateral acceleration sensor. The controller increases the clutch engagement force as the speed of increase of the accelerator opening degree increases, and increases the rate of increase of the clutch engagement force with respect to the increasing speed of the accelerator opening degree when the lateral acceleration increases.

13 Claims, 7 Drawing Sheets

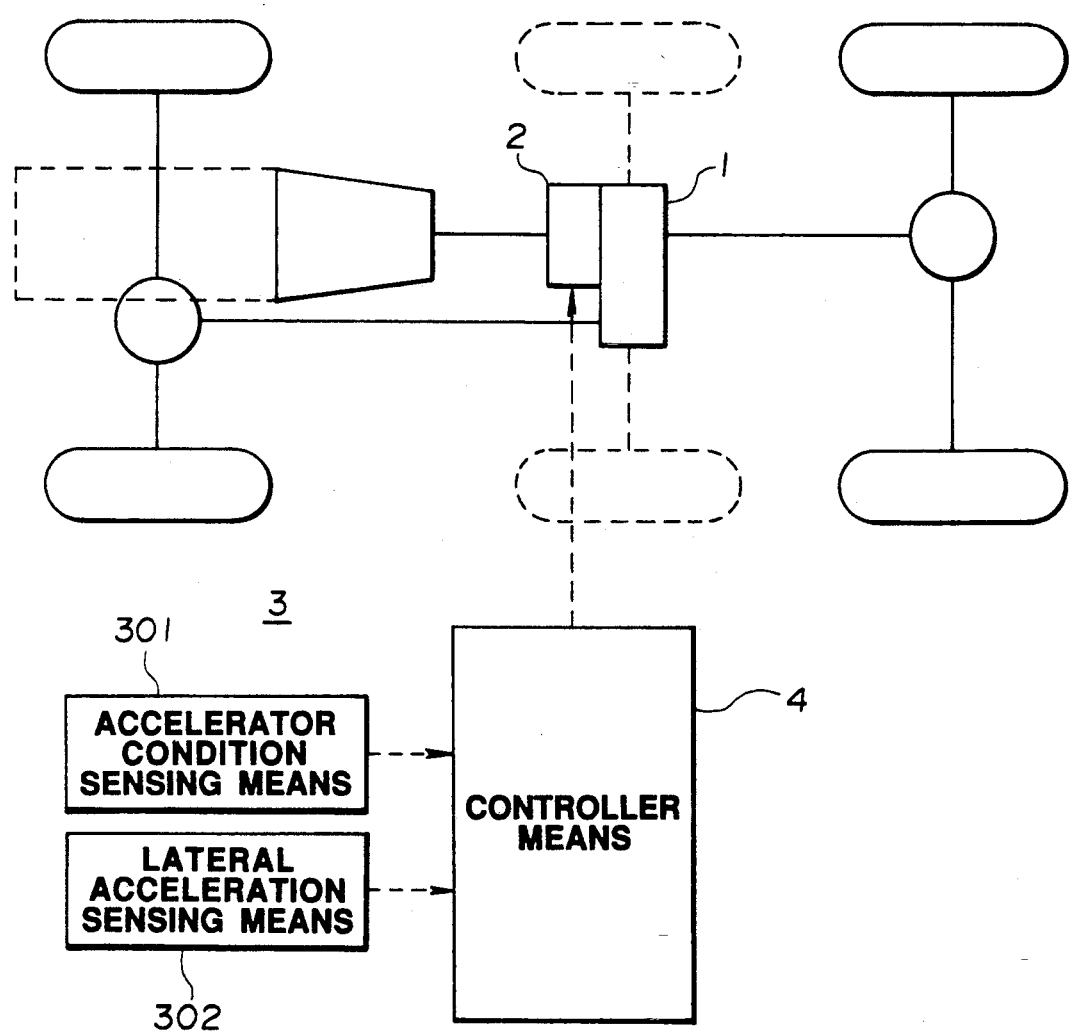

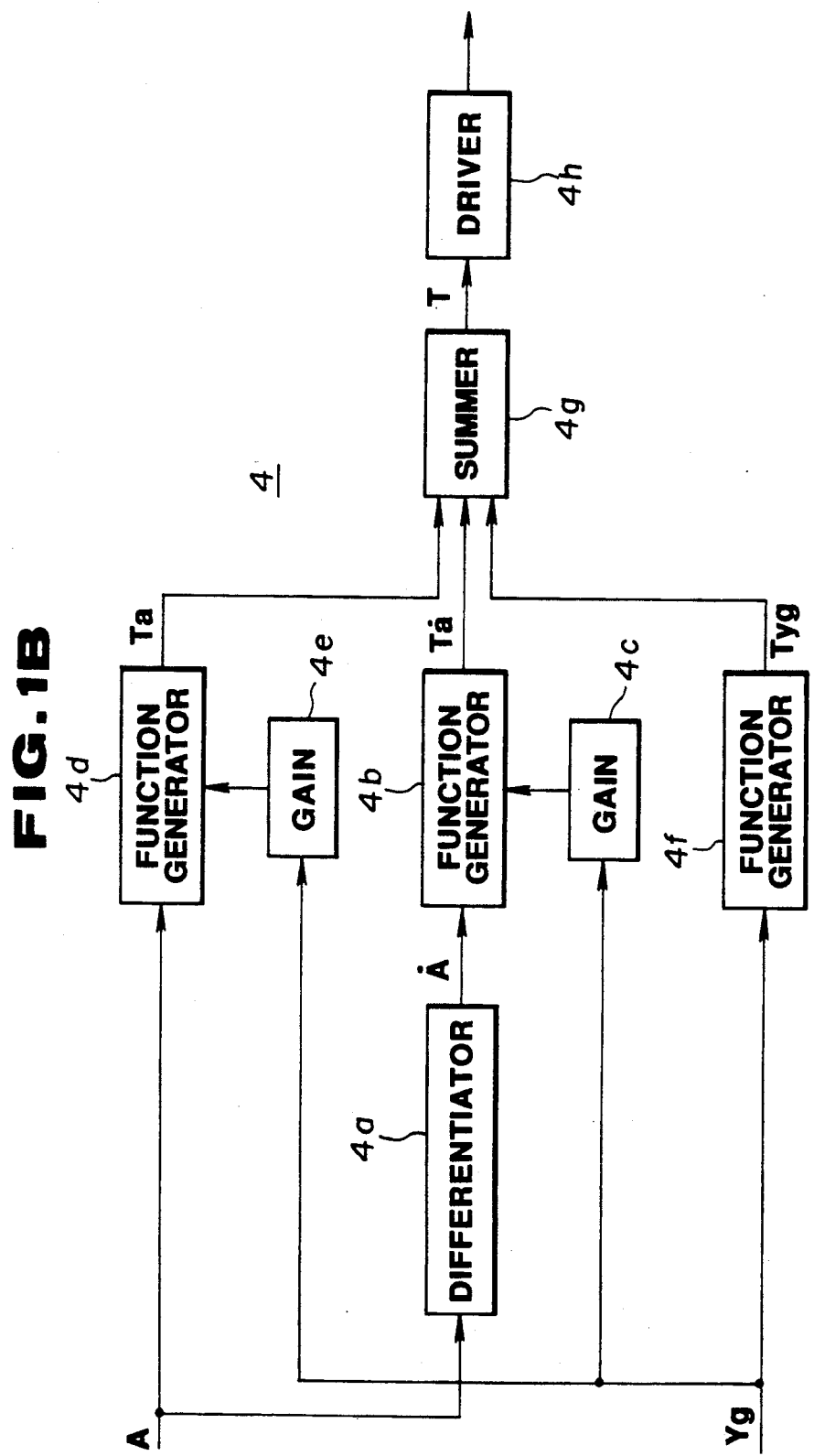

DRIVING TORQUE DISTRIBUTION CONTROL SYSTEM FOR VEHICLE

BACKGROUND OF THE INVENTION

The present invention relates to a control system for controlling a driving torque distribution between two drive wheels of a vehicle, and more specifically to a control system for controlling a clutch engagement force of a torque distribution clutch for varying a driving torque distribution between front and rear drive wheels, or between left and right drive wheels.

A Japanese Patent Provisional Publication No. 63-71428 (Application No. 61-217654) discloses a conventional differential limiting clutch control system for controlling a driving torque distribution between left and right drive wheels. This conventional control system is arranged to produce a control signal representing a command clutch engagement force T which is set equal to a sum of a desired clutch engagement force Ta, which is proportional to an amount of driver's operation applied to an accelerator and a desired clutch engagement force Tyg which is proportional to a lateral acceleration (or a centripetal acceleration) of the vehicle.

In order to prevent a spin of an inside wheel during a turn with a high lateral acceleration and to improve an accelerating ability during a turn in this conventional control system, the clutch engagement force T must be increased, to increase the differential limiting force, by increasing either of the desired clutch force Ta and the desired clutch force Tyg.

If, however, the desired clutch engagement force Tyg, which is responsive to the lateral acceleration, is increased, then the command clutch engagement force T becomes so high at the beginning of a cornering operation that the undesired understeering tendency is increased and the yawing response is adversely affected. Furthermore, an undesired phenomenon of tack-out takes place when the accelerator pedal is released during a high lateral acceleration turn of the vehicle. If on the other hand, the desired clutch engagement force Ta, which is responsive to the accelerating operation, is increased, then this conventional control system makes the differential limiting force high even during a straight ahead acceleration. Therefore, the possibility of a rear end swing becomes higher on a split friction road surface, and an actuator for controlling a fluid pressure is turned on and off too frequently.

SUMMARY OF THE INVENTION

It is an object of the present invention to provide a driving torque distribution control system which can prevent an increase of the understeering tendency when the vehicle enters a corner, prevent a rear end swing on a split friction surface, decrease the frequency with which a clutch is operated, and improve the accelerating ability in a high lateral acceleration turn.

According to the present invention, a driving torque distribution control system, such as a differential limiting force control system for controlling a differential limiting force of a limited slip differential between left and right drive wheels, or a transfer clutch control system for controlling a driving torque distribution between front and rear drive wheels, for a vehicle comprises a torque distributing mechanism, a torque distributing clutch means, a sensor means, and a controller means.

The torque distributing mechanism is a mechanism for dividing a driving torque, such as a driving torque produced by an engine of the vehicle, between first and second drive wheels of the vehicle. The torque distributing mechanism may comprise a differential provided between left and right drive wheels of the vehicle, or a transfer for dividing a driving torque between front and rear axles of the vehicle.

The torque distributing clutch means is a means for varying a torque distribution between the first and second drive wheels by varying a clutch engagement force in response to a control signal. The torque distributing clutch means is provided between a driving torque input side and a driving torque output side of the torque distributing mechanism. The clutch means may comprise a differential limiting clutch or a transfer clutch.

The sensor means is a means for sensing one or more operating conditions of the vehicle. The sensor means comprises an accelerator condition sensing means for sensing a condition of an accelerator of the vehicle, and a lateral acceleration sensing means for sensing a lateral acceleration of the vehicle. The accelerator condition sensing means may comprise an accelerator position sensor for sensing a position of a movable element of the accelerator.

The controller means controls the clutch engagement force of the torque distribution clutch means by producing the control signal in response to sensor signals supplied from the sensor means. The controller means increases the clutch engagement force with an increase in a rapidity with which the accelerator is operated to accelerate the vehicle, and increases a rate of increase of the clutch engagement force with respect to the rapidity of the accelerating operation when the lateral acceleration increases.

When the vehicle enters a corner, the accelerator is turned off. Therefore, the control system of the invention, when designed to control the differential limiting force, can prevent an increase of the understeer by holding the differential limiting force low. When the accelerator pedal is sharply depressed during a turn, the control system of the invention steeply increases the clutch engagement force in response to a rapid accelerating operation of the driver and a high lateral acceleration, and by so doing improves the accelerating performance by preventing an inside wheel spin. When the vehicle is in a straight ahead operation on a road having a split friction surface due to ice or snow, the control system of the invention can prevent a rear end swing by holding the clutch engagement force low in response to a low lateral acceleration even if the accelerator pedal is rapidly depressed. If the accelerator pedal is depressed and released repeatedly during a straight ahead accelerating operation in which the lateral acceleration is low, the control system of the invention can prevent the clutch engagement force and the clutch fluid pressure from changing too much. Therefore, it is possible to decrease the frequency of use of the actuator for actuating the torque distributing clutch.

BRIEF DESCRIPTION OF THE DRAWINGS

FIG. 1A is a schematic view showing a driving torque distribution control system according to the present invention.

FIG. 1B is a block diagram showing a controller means 4 according to one embodiment of the present invention.

FIG. 6 shows a characteristic of a second desired clutch engagement force with respect to an accelerator opening degree. FIG. 7 shows a characteristic of a second control gain with respect to a lateral acceleration. FIG. 8 shows a characteristic of a first desired clutch engagement force with respect to an accelerator opening speed. FIG. 9 shows a characteristic of a first control gain with respect to the lateral acceleration. FIG. 10 shows a characteristic of a lateral acceleration responsive third desired clutch engagement force.

DETAILED DESCRIPTION OF THE INVENTION

Figure 2:
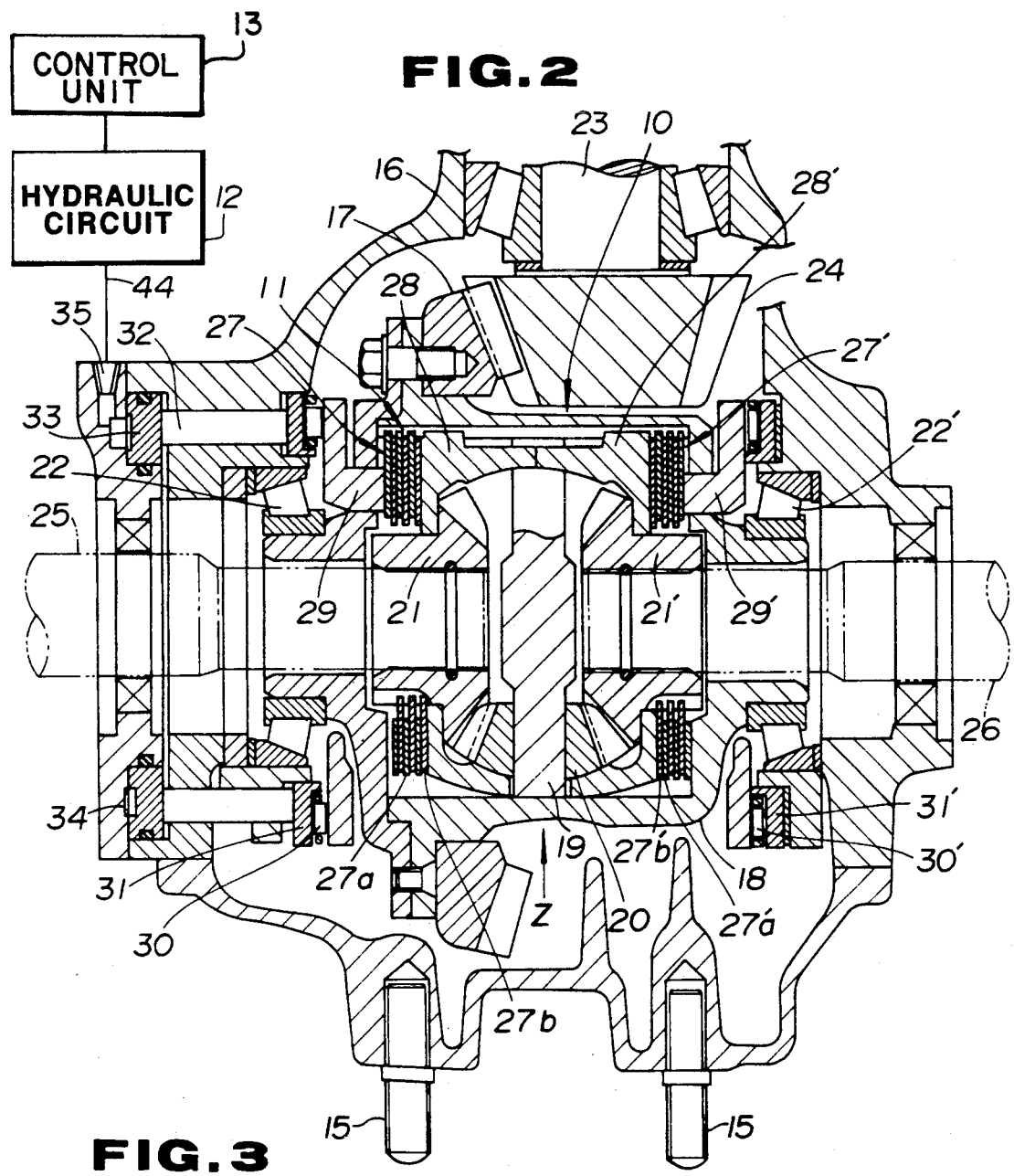
FIG. 2 is a sectional view of a differential gear mechanism employed in the embodiment of the invention.

FIG. 1A schematically shows a driving torque distribution control system according to the present invention. As shown in FIG. 1A, the control system comprises a torque distributing mechanism 1, a torque distributing clutch means 2, a sensor means 3 and a controller means 4.

The torque distributing mechanism 1 may be provided between left and right drive wheels, or between front and rear drive axles. The vehicle may be a two wheel drive vehicle or a four wheel drive vehicle. The torque distributing clutch means may comprise a differential limiting clutch or a transfer clutch. It is possible to employ a transfer clutch system as is disclosed in U.S. Pat. No. 4,754,834. The explanations, and FIGS. 2 and 3 of U.S. Pat. No. 4,754,834 concerning a transfer 23, a transfer clutch 49 and a hydraulic circuit 57 for operating the transfer clutch are hereby incorporated by reference. In any case, the torque distributing mechanism 1 of the present invention may comprise an input rotating member for receiving an input driving torque (for example, an engine torque), a first output rotating member for delivering an output driving torque toward at least one first drive wheel and a second output rotating member for delivering an output torque toward at least one second drive wheel. The first output member is drivingly connected with the input member through a first torque path, and the second output member is drivingly connected with the input member through a second torque path. The torque distributing clutch means 2 of the present invention may include at least one clutch which is disposed in at least one of the first and second torque paths of the torque distributing mechanism 1. When the transfer of the U.S. Pat. No. 4,754,834 is employed, the first output member is connected with the rear wheels, the input member is always connected with the first output member, and the torque distributing clutch means 2 includes only one clutch which is disposed in the second torque path for delivering the torque to the front wheels.

The sensor means 3 comprises an accelerator condition sensing means 301 and a lateral acceleration sensing means 302. The controller means 4 receives sensor signals from the sensor means 3 and controls the clutch engagement force of the clutch means 2 by sending a control signal.

FIG. 1B shows various functional means contained in the controller means 4 according to one embodiment of the invention. The controller means 4 of this example comprises a differentiator means 4a for determining an accelerator opening speed from an accelerator opening degree, a first function generator means 4b for determining an accelerator opening speed responsive first desired clutch engagement force from the accelerator opening speed, a first control gain determining means 4c for determining a first control gain which is used by the first function generator means 4b, in accordance with the lateral acceleration. The controller means 4 shown in FIG. 1B further comprises a second function generator means 4d, a second control gain determining means 4e, a third function generator means 4f, a summer means 4g and a driver means 4h. The second function generator means 4d determines an accelerator opening degree responsive second desired clutch engagement force by using the accelerator opening degree and a second control gain determined by the second gain determining means 4e. The third function generator means 4f determines a lateral acceleration responsive third desired clutch engagement force in accordance with the lateral acceleration. The summer means 4g determines a sum of the accelerator opening speed responsive first desired clutch engagement force, the accelerator opening degree responsive second desired clutch engagement force, and the lateral acceleration responsive third desired clutch engagement force. The driver means 4e produces the control signal in accordance with the sum determined by the summer means 4g.

FIGS. 2-10 shows a driving torque distribution control system of the embodiment more concretely. The driving torque distribution control system of this embodiment is a differential (slip) limiting force control system for controlling a driving torque distribution between left and right drive wheels.

Figure 3:
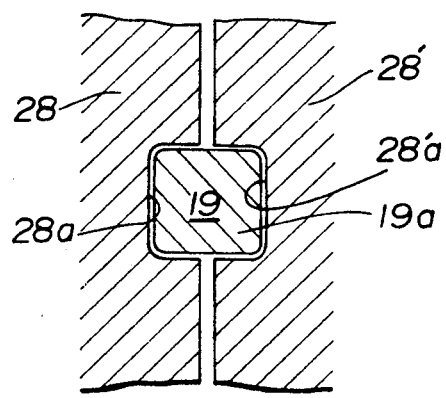
FIG. 3 is a view take in a direction shown by an arrow Z in FIG. 2.

In this embodiment, the torque distributing mechanism 1 comprises a differential gear mechanism 10 shown in FIGS. 2 and 3. The torque distributing clutch means 2 comprises a differential limiting clutch system 11 operated by a hydraulic pressure supplied from a hydraulic circuit (system) 12. The controller means 4 comprises a control unit 13 shown in FIG. 4. The sensor means 3 comprises a sensor group 14 including sensors for sensing operating conditions of the vehicle.

The differential gear mechanism 10 is a gear system designed to perform a differential function of permitting one of the left and right drive wheels to rotate faster than the other, and a torque distributing function of equally distributing engine power between the left and right drive wheels. The differential gear mechanism 10 has a housing 16 which is fixed to the vehicle body by stud bolts 15. The differential gear mechanism 10 further includes a ring gear 17, a differential case 18, a pinion mate shaft 19, at least one differential pinion 20, and left and right side gears 21 & 21'. These components are all rotating members, and they are enclosed in the housing 16.

The differential case 18 is rotatably supported on the housing 16 by tapered roller bearings 22 & 22'. The ring gear 17 is fixed to the differential case 18 so that the ring gear 17 and the case 18 rotate together. The ring gear 17 is in engagement with a drive pinion 24 provided in an end of a propeller shaft (or drive shaft) 23 of the vehicle. Therefore, engine torque is transmitted from the propeller shaft 23, through the drive pinion gear 24 and the ring gear 17, to the differential case 18.

The left and right side gears 21 & 21' are, respectively, connected with left and right axle shafts 25 and 26 of the left and right drive wheels of the vehicle.

The differential limiting clutch system 11 is provided between a driving torque input side and a driving torque output side of the differential mechanism 10, and arranged to produce a differential limiting torque by receiving a hydraulic oil pressure. The clutch system 11 is disposed in the differential case 18. The clutch system 11 of this embodiment has left and right multiple disc friction clutches 27 & 27', pressure rings 28 & 28', reaction plates 29 & 29', thrust bearings 30 & 30', spacers 31 & 31', push rods 32, a pressure piston 33, a fluid chamber 34, and a pressure port 35.

Each of the friction clutches 27 & 27' has friction plates 27a or 27'a, and friction discs 27b or 27'b. The friction plates 27a & 27'a of both clutches are engaged with the differential case 18 (the torque input side) so as to prevent relative rotation therebetween. The friction discs 27b of the left clutch 27 are engaged with the left side gear 21 (the torque output side) so as to prevent relative rotation therebetween. The friction discs 27'b of the right clutch 27' are engaged with the right side gear 21' (the torque output side) so as to prevent relative rotation therebetween. In each clutch, the friction plates and discs are alternately arranged, and the alternating pack of the friction plates and discs is sandwiched between the adjacent pressure ring (28 or 28') and reaction plate (29 or 29').

The pinion mate shaft 19 has end portions 19a each having a square cross sectional shape as shown in FIG. 3. Each square end portion 19a of the pinion mate shaft 19 is received in a square hole formed by confronting rectangular recesses 28a and 28'a of the left and right pressure rings 28 & 28'. This structure prevents occurrence of a thrust force due to a rotational wheel speed difference between the left and right wheels as in a torque proportional type differential limiting means. U.S. Pat. Nos. 4,741,407; 4,679,463 and 4,790,404 show similar differential gear mechanisms.

When the hydraulic pressure is supplied to the pressure port 35, the pressure piston 33 moves to the right as viewed in FIG. 2, in parallel to the axis of the side gears 21 & 21', and applies a forc corresponding to the fluid pressure to engage the clutches 27 & 27'. A clutch engagement force is transmitted through the piston rods 32, the spacer 31 and the thrust bearing 30, to the reaction plate 29, so that the friction plates and discs 27a and 27b are compressed between the reaction plate 29 and the pressure ring 28. A reaction force is applied from the housing 16 to the right clutch 27'. Therefore, the friction plates and discs 27'a and 27'b are also engaged between the reaction plate 29' and the pressure ring 28'.

The hydraulic circuit (or fluid pressure source) 12 includes an oil pressure pump 40, a pump motor 41, a pump pressure passage 42, a drain passage 43, a control pressure passage 44 and an electromagnetic proportional pressure reducing valve 46 having a valve solenoid 45. The reducing valve 46 receives an output pressure of the pump 40 through the pump pressure passage 42, and produces a control pressure P which is proportional to the magnitude of a control current signal i supplied from the control unit 13. The control pressure P is supplied through the control pressure passage 44 and the pressure port 35, to the pressure chamber 34 of the differential limiting clutch system 11. In this way, the control unit 13 can control the clutch fluid pressure of the clutch system 11 by sending the control current signal i to the valve solenoid 45. A differential limiting force T produced by the limiting clutch system 11 is proportional to the control pressure P, as expressed by the following relationship.

$$T \propto P \cdot \mu \cdot n \cdot r \cdot A_c$$

where $\mu$ is a friction coefficient between the friction plates and discs, n is the number of the friction plates, r is an average radius of the clutch, and $A_c$ is a pressure receiving area. Therefore, the control unit 13 can control the differential limiting force T by varying the control pressure P.

Figure 4:
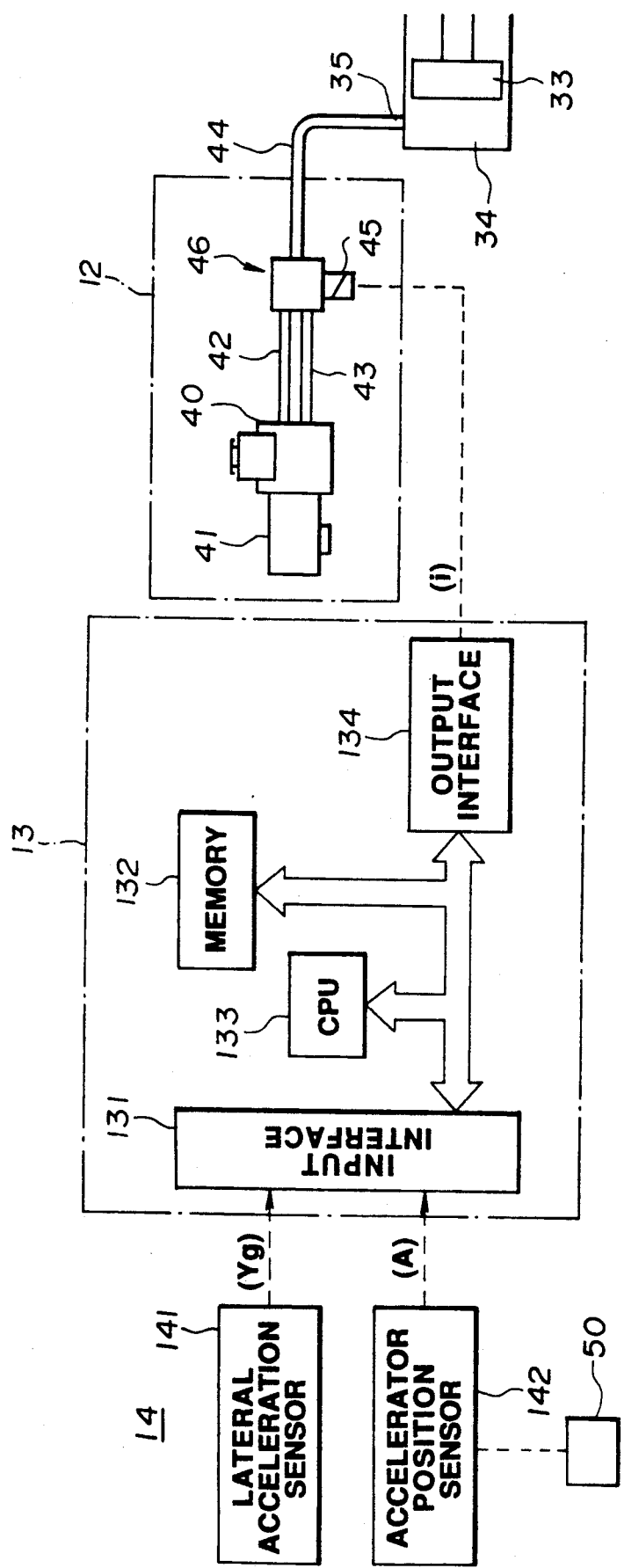
FIG. 4 is a schematic view showing sensors, a control unit and an actuator employed in the embodiment of the invention.

The control unit 13 is made up of an onboard microcomputer and one or more peripheral equipments. In this embodiment, the control unit 13 includes an input interface circuit 131, a memory section 132, a central processing unit (CPU) 133, and an output interface circuit 134, as shown in FIG. 4.

The sensor group 14 of this embodiment includes a lateral acceleration sensor 141, and an accelerator position sensor 142. The lateral acceleration sensor 141 senses a lateral acceleration Yg of the vehicle and produces a lateral acceleration signal representing the sensed lateral acceleration. The accelerator position sensor 142 senses an accelerator opening degree (or throttle opening degree) A by sensing the position of a movable element of an accelerator 50 of the vehicle. In this embodiment, the accelerator 50 is a system for increasing the speed of the vehicle by varying the supply of fuel to an internal combustion engine of the vehicle. The accelerator 50 of this embodiment comprises an accelerator pedal, a throttle valve and a linkage therebetween. The accelerator position sensor 142 produces a signal representing the accelerator opening degree A which can be regarded as a driver's input applied to the accelerator or the amount of driver's operation applied to the accelerator.

Figure 5:
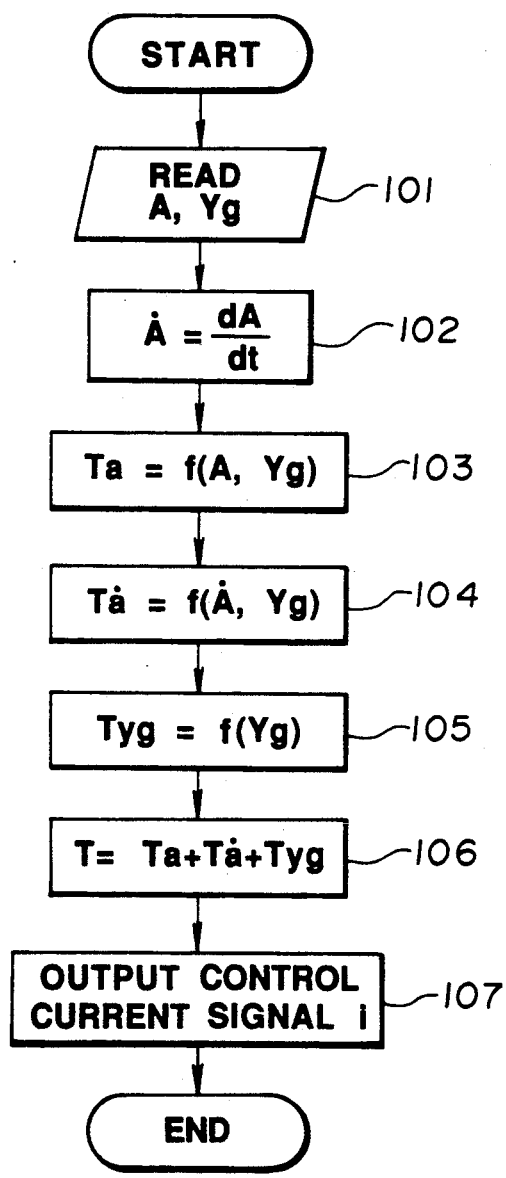
FIG. 5 is a flowchart showing a control procedure performed by the control unit shown in FIG. 4.

The control unit 13 of this embodiment controls the differential limiting force by periodically performing a control procedure shown in FIG. 5 at regular intervals of a predetermined control cycle.

At a step 101, the control unit 13 reads current values of the accelerator opening degree A and the lateral acceleration Yg.

At a step 102, the control unit 13 calculates a time rate of change of the accelerator opening degree $\dot{A}$ by using the following equation.

$$\dot{A} = \frac{dA}{dt} = \frac{A_n - A_{n-1}}{\Delta t}$$

In this equation, $\epsilon t$ is the control cycle (or a time period of the control cycle), $A_n$ is the current value of the accelerator opening degree A, $A_{n-1}$ is a previous value of the accelerator opening degree which has been obtained one control cycle ago in the last execution of the control program.

The step 102 corresponds to the differentiator means 4a shown in FIG. 1B. The time rate of change of the accelerator opening degree (or accelerator opening speed) is the speed of the movable element of the accelerator 50 or the rapidity with which the driver operates the accelerator 50 to accelerate the vehicle.

At a step 103, the control unit 13 determines an accelerator opening degree responsive desired clutch engagement force (second desired clutch engagement force) Ta from the accelerator opening degree A and the lateral acceleration Yg. First, the control unit 13 determines a value of a control gain (second control gain) Ka according to a Ka-Yg characteristic shown in FIG. 7. This operation corresponds to the gain determining means 4e. Then, the control unit 13 determines the opening degree responsive desired clutch engagement force Ta according to a Ta-A characteristic shown in FIG. 6 by using the current value of the control gain Ka. This operation corresponds to the function generator means 4d for determining the accelerator opening degree responsive desired clutch engagement force Ta. It is possible to determine the desired clutch engagement force by performing a table look-up or solving mathematical equations. For example, the accelerator opening degree responsive desired clutch engagement force Ta is given by the following equation.

$$Ta = f(A, Yg)$$
$$= \min\{\max(k' - (Yg - Yo), Kamin), Kamax\} \times \max\{(A - Ao), 0\}.$$

Figure 7:
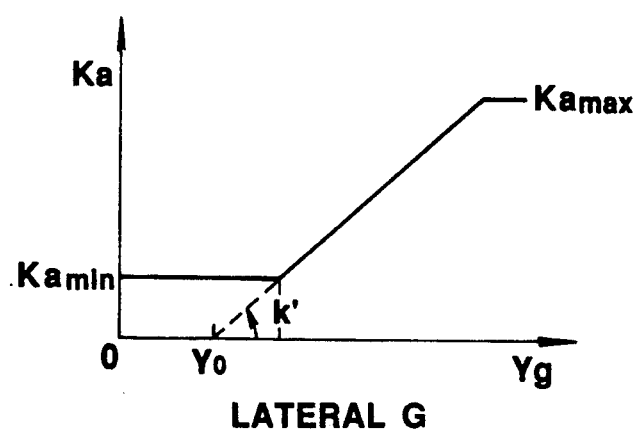

As shown in FIG. 7, the second control gain Ka is a monotone nondecreasing function of the lateral acceleration Yg. The second control gain Ka is set equal to a product obtained by multiplying a difference $(Yg-Yo)$ by a predetermined constant coefficient $k'$ when the product is higher than a predetermined minimum second control gain value Kamin. The difference $(Yg-Yo)$ is a difference obtained by substracting a predetermined constant Yo from the lateral acceleration Yg. The second control gain Ka is set equal to the minimum second control gain value Kamin when the product $k'(Yg-Yo)$ is smaller than the minimum second control gain value Kamin. The second control gain Ka is increased linearly with increase in the lateral acceleration up to a predetermined maximum second control gain value Kamax. Thereafter, the second control gain Ka is held equal to the maximum second control gain value Kamax irrespective of further increase of the lateral acceleration Yg.

Figure 6:
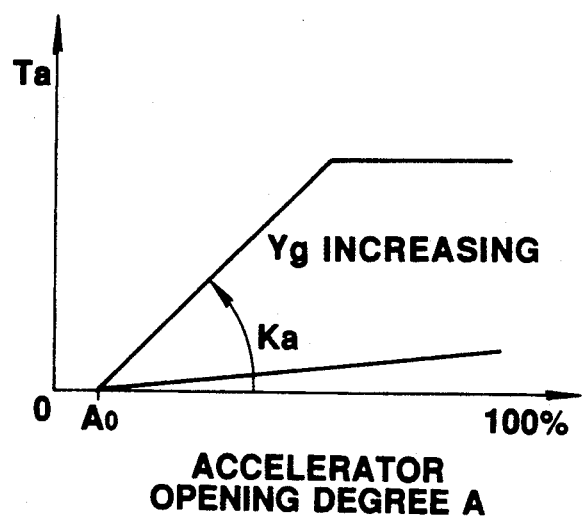
FIGS. 6-10 are graphs showing characteristics employed in the embodiment of the invention.

As shown in FIG. 6, the acceleration opening degree responsive desired clutch engagement force (second desired clutch engagement force) Ta is a monotone nondecreasing function of the accelerator opening degree A. In this embodiment, the opening degree responsive desired clutch engagement force Ta is equal to zero when the acceleration opening degree A is smaller than a predetermined accelerator opening degree value Ao. The opening degree responsive desired clutch engagement force Ta increases linearly from zero with increase in the accelerator opening degree from the predetermined opening degree value Ao. The accelerator opening degree responsive desired clutch engagement force Ta is prevented from exceeding a predetermined maximum magnitude.

At a step 104, the control unit 13 determines an accelerator opening speed responsive desired clutch engagement force (or first desired clutch engagement force) Tå from the time rate Å of increase of the accelerator opening degree A and the lateral acceleration Yg. First, the control unit 13 determines a first control gain Kå according to a Kå-Yg characteristic shown in FIG. 9.

This operation corresponds to the control gain determining means 4c shown in FIG. 1B. Then, the control unit 13 determines the accelerator opening speed responsive desired clutch engagement force Tå according to a Tå-Å characteristic shown in FIG. 8. This operation corresponds to the function generator means 4b for determining the first desired clutch engagement force Tå.

Figure 9:
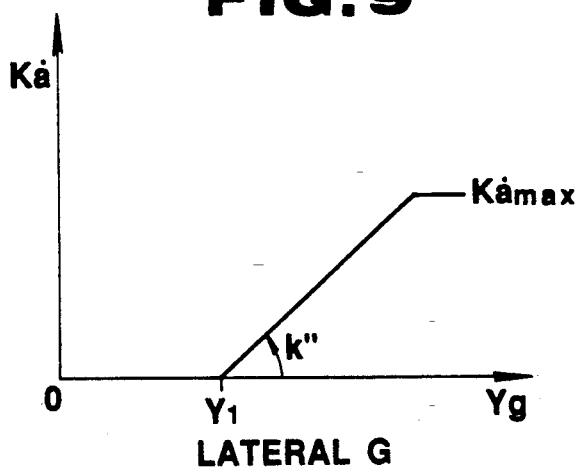

As shown in FIG. 9, the first control gain Kå is a monotone nondecreasing function of the lateral acceleration Yg. The first control gain Kå is equal to zero when the lateral acceleration Yg is lower than a predetermined first lateral acceleration value $Y_1$. The first control gain Kå increases linearly with regard to the lateral acceleration Yg when the lateral acceleration Yg is higher than the first lateral acceleration value $Y_1$. After the first control gain Kå reaches a predetermined maximum first control gain value Kåmax, the first control gain Kå is fixed at the maximum first control gain value Kåmax so that a further increase in the lateral acceleration Yg produces no further increase in the first control gain Kå. That is, the first control gain Kå is prevented from exceeding the maximum first control gain value Kåmax. An inclined straight line segment of the characteristic line shown in FIG. 9 is expressed by Kå=k''(Yg−$Y_1$) where k'' is a predetermined constant coefficient.

Figure 8:
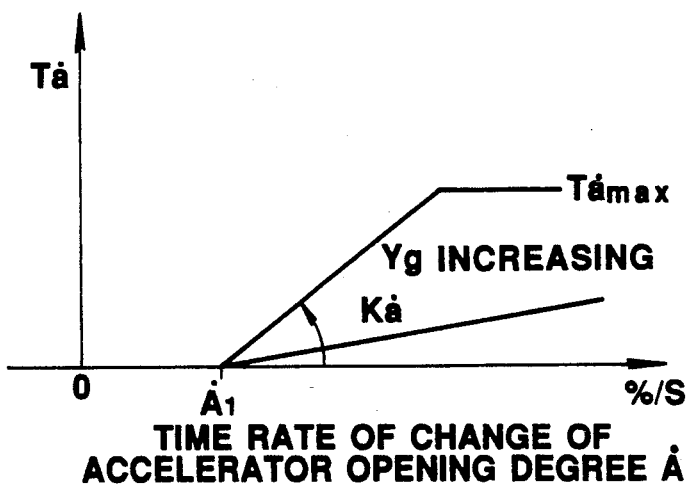

As shown in FIG. 8, the first desired clutch engagement force Tå is a monotone nondecreasing function of the accelerator opening speed Å. In this embodiment, the first desired clutch engagement force Tå is equal to zero when the accelerator opening speed Å is lower than a predetermined first accelerator opening speed value $Å_1$. When the accelerator opening speed Å is higher than the first accelerator opening speed value $Å_1$, the first desired clutch engagement force Tå. increases from zero linearly with increase in the accelerator opening speed Å along an inclined straight line segment whose slope is set equal to the value of the first control gain Kå corresponding to the current value of the lateral acceleration Yg. The first desired clutch engagement force Tå is prevented from exceeding a predetermined maximum first desired clutch engagement force value Tåmax. The maximum first desired clutch engagement force value Tåmax is an upper limit of the first desired clutch engagement force Tå.

In this way, the control unit 13 increases the first control gain Kå as the lateral acceleration Yg increases, and increases the first desired clutch engagement force Tå with increase in the acceleration opening speed Å at the increasing rate equal to the first control gain Kå.

It is possible to determine the first desired clutch engagement force Tå by using a table look-up or one or more stored mathematical equations. For example, the first desired clutch engagement force can be determined according to the following equation.

$$Ta = f(A, Yg)$$
$$= \min\{\max(k'' - (Yg - Y_1), 0), Kamax\} \times \max\{(A - A_1), 0\}.$$

At a step 106, the control unit 13 determines a lateral acceleration responsive third desired clutch engagement force Tyg in accordance with the lateral acceleration Yg. The third desired clutch engagement force Tyg is dependent only on the lateral acceleration Yg. The step 106 corresponds to the third function generator means 4f shown in FIG. 1B. The characteristic of the third desired clutch engagement force Tyg with respect to the lateral acceleration Yg of this embodiment is expressed by a graph in FIG. 10, and by a mathematical equation as follows:

$$Tyg = f(Yg)$$
$$= \min\{\max(k'''(Yg - Y_2), 0), Tygmax\}$$

Figure 10:
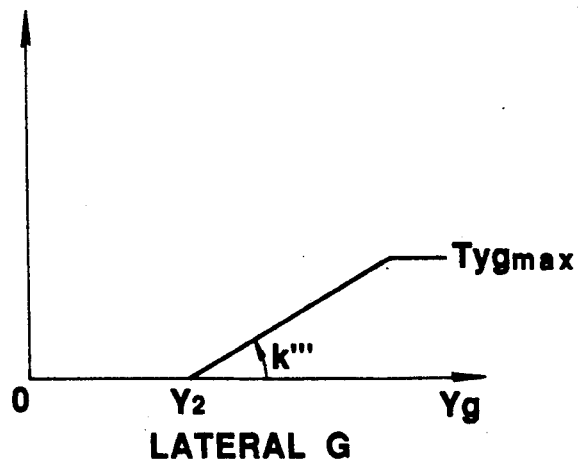

As shown in FIG. 10, the lateral acceleration dependent third desired clutch engagement force Tyg of this embodiment increases as a monotone nondecreasing function of Yg. The third desired clutch engagement force Tyg is equal to zero when the lateral acceleration Yg is lower than a predetermined second lateral acceleration value $Y_2$. When the lateral acceleration Yg is higher than the second lateral acceleration value $Y_2$, the third desired clutch engagement force Tyg increases linearly at a predetermined rate with increase in the lateral acceleration Yg along an inclined straight line segment whose slope is set equal to a predetermined third constant coefficient $k'''$. The third desired clutch engagement force Tyg cannot exceed a predetermined maximum third desired clutch engagement value Tygmax.

At a step 106, the control unit 13 determines a command clutch engagement force T which is a sum of the three desired clutch engagement forces Ta, Tå and Tyg. That is, $$T = Ta + Tå + Tyg$$

The step 106 corresponds to the summer means 4g shown in FIG. 1B. In this embodiment, the sum of Ta and Tyg is a basic desired clutch engagement force, and the command clutch engagement force T equals the sum of the first desired clutch engagement force Tå and the basic desired clutch engagement force.

At a step 107, the control unit 13 outputs a control current signal i representing the command clutch engagement force T. to the valve solenoid 45 of the pressure reducing solenoid valve 46. In response the control signal i, the hydraulic system 12 produces the clutch pressure P corresponding to the command clutch engagement force T. In this way, the control system of this embodiment controls the actual clutch engagement force produced in the clutch system 11 to be equal to the command clutch engagement force T.

The driving torque distribution control system of this embodiment can provide superior driving performances as follows:

(1) When the vehicle is accelerated in a high lateral acceleration cornering operation;

When the vehicle enters a corner, the accelerator is turned off. Therefore, the accelerator opening degree responsive second desired clutch engagement force Ta is approximately equal to zero (Ta≈0), and the accelerator opening speed responsive first desired clutch engagement force Tå is also approximately equal to zero (Tå≈0). Therefore, the control unit 13 determines the command clutch engagement force T almost only by the lateral acceleration responsive third desired clutch engagement force Tyg. That is, T≈Tyg. As a result, the control system prevents an undesired increase of the understeering tendency by holding the differential limiting force at a low level at the beginning of a cornering operation.

If the accelerator pedal is rapidly depressed during a high lateral acceleration turn on a dry paved road, then the time rate Å of change of the accelerator opening degree A becomes very high, and the first control gain Kå also becomes high in response to a high lateral acceleration. Therefore, the control system steeply increases the clutch engagement force (i.e. the differential limiting force) according to T=Tå+Tyg. Then, the accelerator opening degree A increases with time, and the command clutch engagement force T is given T=Ta+Tå+Tyg. Thus, the control system of this embodiment prevents an inside wheel spin and improves the accelerating performance by increasing the differential limiting force.

(2) In a straight ahead operation:

When the vehicle is driven along a straight line on a road having a split friction surface due to ice or snow, the lateral acceleration Yg is low, and therefore, the control system of this embodiment does not increase the clutch engagement force too much even if the accelerator pedal is rapidly depressed. Consequently, the control system can prevent a rear end swing.

When the accelerator pedal is switched on and off repeatedly during a straight ahead operation of a low lateral acceleration, the control system of this embodiment changes the hydraulic clutch fluid pressure only to a limited extent, so that the frequency of use of the solenoid valve is decreased.

The present invention is applicable to a driving force distribution control system for a four wheel drive vehicle, as disclosed in a Japanese Patent Application No. 59-276048. In this case, the driving torque distribution control system of the present invention is arranged to control the clutch engagement force of a torque distributing clutch (or transfer clutch) for varying a driving torque distribution between the front and rear axles of the vehicle. The thus-arranged control system can ensure the superior yaw steering response of the vehicle due to an oversteer moment, by holding the transfer clutch engagement force at a low level to increase the share of the driving torque distributed to the rear wheels at the entrance of a corner. Furthermore, this control system can reduce the degree of a drive wheel slip and improve the accelerating performance during a turn by increasing the transfer clutch engagement force to increase the driving torque share of the front wheels toward 50% during a turn.

According to the present invention, the control system can employ any of various methods for varying the clutch engagement force. For example, it is possible to employ a duty factor control system including an electromagnetic valve for opening and closing a fluid passage, and a driver circuit for producing a periodic pulse signal having a controlled duty factor (or duty cycle) to actuate the valve. Furthermore, it is possible to employ an electromagnetic clutch.

What is claimed is:

1. A driving torque distribution control system for a vehicle, comprising:
   a torque distributing mechanism for dividing a driving torque between first and second drive wheels of the vehicle;
   a torque distributing clutch means for varying a torque distribution between said first and second drive wheels by varying a clutch engagement force in response to a control signal, said clutch means being provided between a driving torque input side and a driving torque output side of said distributing mechanism;

a sensor means for sensing an operating condition of the vehicle, said sensor means comprising an accelerator condition sensing means for sensing a condition of an accelerator of the vehicle, and a lateral acceleration sensing means for sensing a lateral acceleration of the vehicle; and a controller means for controlling the clutch engagement force of said torque distributing clutch means by producing said control signal in response to sensor signals supplied from said sensor means, said controller means increasing the clutch engagement force with increase in a rapidity with which said accelerator is operated to accelerate the vehicle, and increasing a rate of increase of the clutch engagement force with respect to said rapidity when said lateral acceleration increases.

2. A control system according to claim 1 wherein said accelerator condition sensing means includes a means for determining a driver's input applied to said accelerator of the vehicle by sensing the condition of said accelerator, and said controller means includes a means for increasing the clutch engagement force of said torque distributing clutch means as an acceleration input speed increases, and increasing a time rate of increase of the clutch engagement force with respect to said acceleration input speed as said lateral acceleration increase, said acceleration input speed being a time rate of increase of said driver's input.

3. A driving torque distribution control system for a vehicle, comprising:

a torque distributing mechanism for dividing a driving torque between first and second drive wheels of the vehicle;

a torque distributing clutch means for varying a torque distribution between said first and second drive wheels by varying a clutch engagement force in response to a control signal, said clutch means being provided between a driving torque input side and a driving torque output side of said distributing mechanism;

a sensor means for sensing an operating condition of the vehicle, said sensor means comprising an accelerator condition sensing means for sensing a condition of an accelerator of the vehicle, and a lateral acceleration sensing means for sensing a lateral acceleration of the vehicle; and a controller means for controlling the clutch engagement force of said torque distributing clutch means by producing said control signal in response to sensor signals supplied from said sensor means, said controller means increasing the clutch engagement force with increase in a rapidity with which said accelerator is operated to accelerate the vehicle, and increasing a rate of increase of the clutch engagement force with respect to said rapidity when said lateral acceleration increases;

wherein said accelerator condition sensing means comprises a sensor for sensing a position of a movable element of said accelerator of the vehicle and producing a first sensor signal representing a throttle opening degree of an engine of the vehicle, and said controller means includes a means for determining a throttle opening speed which is a time rate of increase of said throttle opening degree, further determining a first control gain which increases as said lateral acceleration increases, and further determining a first desired clutch engagement force which increases with increase in said throttle opening speed at a rate which is set equal to said first control gain.

4. A control system according claim 3 wherein said controller means includes a means for determining a basic desired clutch engagement force which is dependent on at least one of said throttle opening degree and said lateral acceleration and which is independent of said throttle opening speed, and producing said control signal representing a sum of said first desired clutch engagement force and said basic desired clutch engagement force.

5. A control system according to claim 4 wherein said torque distributing mechanism comprises a differential gear for dividing a driving torque between said first and second wheels which are left and right drive wheels of the vehicle, and said torque distributing clutch means comprises a differential limiting clutch for limiting a differential action of said differential gear.

6. A control system according to claim 4 wherein said controller means comprises a first control gain determining means for determining said first control gain in accordance with said lateral acceleration, and a first desired clutch engagement force determining means for determining said first desired clutch engagement force in accordance with said throttle opening speed and said first control gain so that said first desired clutch engagement force increases linearly at a rate equal to said first control gain with increase in said throttle opening speed.

7. A control system according to claim 6 wherein said controller means further comprises a second control gain determining means for determining a second control gain in accordance with said lateral acceleration so that said second control gain increases as said lateral acceleration increases, a second desired clutch engagement force determining means for determining a second desired clutch engagement force in accordance with said throttle opening degree and said second control gain so that said second desired clutch engagement force increases linearly at a rate equal to said second control gain with increase in said throttle opening degree, and a summing means for determining a sum of said first and second desired clutch engagement forces.

8. A control system according to claim 7 wherein said controller means further comprises a third desired clutch engagement force determining means for determining a third desired clutch engagement force which is dependent only on said lateral acceleration, and which increases as said lateral acceleration increases, said summing means includes a means for determining a sum of said first, second and third desired clutch engagement forces, and said controller means further comprises a means for producing said control signal in accordance with said sum of said first, second and third desired clutch engagement forces.

9. A control system according to claim 8 wherein said first control gain determining means includes a means for holding said first control gain equal to zero when said lateral acceleration is lower than a predetermined first lateral acceleration value, increasing said first control gain from zero linearly with increase in said lateral acceleration when said lateral acceleration is higher than said first lateral acceleration value, and preventing said first control gain from exceeding a predetermined maximum first control gain value, and said first desired clutch engagement force determining means includes a means for holding said first desired clutch engagement force equal to zero when said throttle opening speed is lower than a predetermined first throttle opening speed value, increasing said first desired clutch engagement force from zero linearly with increase in said throttle opening speed when said throttle opening speed is higher than said first throttle opening speed value, and preventing said first desired clutch engagement force from exceeding a predetermined maximum first desired clutch engagement force value.

10. A control system according to claim 9 wherein said second control gain determining means includes a means for setting said second control gain equal to a product between a predetermined constant coefficient and a difference obtained by subtracting a predetermined constant from said lateral acceleration when said product is higher than a predetermined minimum second control gain value, setting said second control gain equal to said minimum second control gain value when said product is smaller than said minimum second control gain value, and preventing said second control gain from exceeding a predetermined maximum second control gain value, and said second desired clutch engagement force determining means includes a means for holding said second desired clutch engagement force equal to zero when said throttle opening degree is smaller than a predetermined throttle opening degree value, increasing said second desired clutch engagement force from zero linearly with increase in said throttle opening degree from said predetermined throttle opening degree value, and preventing said second desired clutch engagement force from exceeding a predetermined maximum second clutch engagement force value.

11. A control system according to claim 10 wherein said third desired clutch engagement force determining means includes a means for holding said third desired clutch engagement force equal to zero when said lateral acceleration is lower than a predetermined second lateral acceleration value, increasing said third desired clutch engagement force from zero linearly with increase in said lateral acceleration from said second lateral acceleration value, and preventing said third desired clutch engagement force from exceeding a predetermined maximum third clutch engagement force value.

12. A control system according to claim 11 wherein said torque distributing mechanism comprises a differential gear for dividing a driving torque between said first and second wheels which are left and right drive wheels of the vehicle, and said torque distributing clutch means comprises a differential limiting clutch for limiting a differential action of said differential gear.

13. A control system according to claim 11 wherein said torque distributing mechanism comprises a transfer mechanism for dividing a driving torque between said first and second wheels which are front and rear drive wheels of the vehicle, and said torque distributing clutch means comprises a transfer clutch for varying a driving torque distribution between the front and rear wheels.

* * * * *